United States Patent [19]

Williams

[11] 4,355,152

[45] Oct. 19, 1982

[54] SOLVENT RESISTANT HALOGENATED AROMATIC POLYESTER FIBERS AND PROCESS THEREFOR

[75] Inventor: Albert G. Williams, West Orange, N.J.

[73] Assignee: Celanese Corporation, New York, N.Y.

[21] Appl. No.: 208,363

[22] Filed: Nov. 19, 1980

[51] Int. Cl.³ .............................................. C08G 63/68
[52] U.S. Cl. .................................. 528/191; 264/205; 264/210.8; 264/235.6; 264/346
[58] Field of Search ...................... 264/184, 235.6, 346, 264/341, 343, 205, 210.8; 528/190, 191, 193

[56] References Cited

U.S. PATENT DOCUMENTS

| | | | |
|---|---|---|---|
| 3,864,448 | 2/1975 | Stackman et al. | 264/205 |
| 4,083,829 | 4/1978 | Calandann et al. | 528/193 |
| 4,118,372 | 10/1978 | Schaetgen | 528/193 |
| 4,128,614 | 12/1978 | Gilbert | 264/205 |
| 4,184,996 | 1/1980 | Calandann et al. | 528/190 |
| 4,247,514 | 1/1981 | Luise | 264/346 |
| 4,287,332 | 9/1981 | Jackson et al. | 264/346 |

Primary Examiner—Jay H. Woo
Attorney, Agent, or Firm—Burns, Doane, Swecker & Mathis

[57] ABSTRACT

Solvent resistant halogenated aromatic polyester fibers are prepared by heat treating the fibers at substantially constant length at a temperature of from about 270° to about 295° C. for from about 5 to about 60 minutes. The heat treated fibers have improved solvent resistance in that they are capable of withstanding 5 to 20 minute immersions in the commercial dry cleaning solvent perchloroethylene which is at a temperature of from about 60° to about 70° C.

24 Claims, No Drawings

SOLVENT RESISTANT HALOGENATED AROMATIC POLYESTER FIBERS AND PROCESS THEREFOR

BACKGROUND OF THE INVENTION

Halogenated aromatic polyesters such as the condensation products of 4,4'-isopropylidene-2,2'6,6-tetrachlorodiphenol or 4,4'-isopropylidene-2,2',6,6'-tetrabromodiphenol with isophthalic acid and/or terephthalic acid or the ester-forming derivatives thereof have been used to produce a number of inherently non-burning fibrous materials which are particularly advantageous when fibrous articles are required for use in fire-control environments, such as children's sleepwear, suits for fire fighters, hospital furnishings, and uniforms for military and civilian personnel. However, these halogenated aromatic polyesters are sensitive to organic solvents such as perchloroethylene, which is a commercial dry cleaning solvent.

Copending patent application U.S. Ser. No. 208,364, entitled "Improved Processes for Drawing Halogenated Aromatic Polyester Fibers", filed concurrently herewith by Albert G. Williams, discloses a process for drawing halogenated aromatic polyester fibers at a temperature of from about 315° to about 355° C. at a draw ratio of from about 3:1 to about 10:1 to produce halogenated aromatic polyester fibers having improved tensile properties. To some extent, this drawing process also improves the solvent resistance of the fibers. However, some solvent sensitivity is present even after the halogenated aromatic polyester is drawn at these high draw ratios and elevated temperatures.

U.S. Pat. No. 3,684,766 and U.S. Pat. No. 3,780,148 describe a process for crystallizing a low molecular weight polyester with non-halogenated crystallizing agents prior to a second stage reaction.

The search has continued for methods of improving the solvent resistance of halogenated aromatic polyester fibers. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a process for improving the solvent resistance of halogenated aromatic polyester fibers.

A further object of the present invention is to provide halogenated aromatic polyester fibers which possess improved solvent resistance.

Other objects and advantages of the invention will become apparent from the following summary and description of the preferred embodiments of the present invention.

In one aspect, the present invention provides a process for improving the solvent resistance of halogenated aromatic polyester fibers. This process comprises heat treating the halogenated aromatic polyester fibers at substantially constant length at a temperature of from about 270° to about 295° C. for from about 5 to about 60 minutes to produce modified halogenated aromatic polyester fibers capable of withstanding 5 to 20 minute immersions in perchloroethylene which is at a temperature of from about 60° to about 70° C.

In another aspect, the present invention provides halogenated aromatic polyester fibers prepared by the above process having improved solvent resistance.

DESCRIPTION OF THE PREFERRED EMBODIMENTS

Halogenated aromatic polyesters have recurring units of the structural formula:

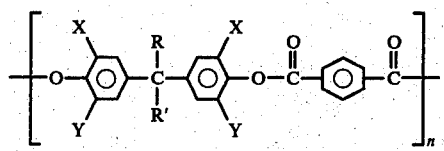

wherein X, which may be the same or different, may be chlorine or bromine, Y, which may be the same or different, may be hydrogen, chlorine, or bromine, R and R' may be the same or different and represent lower alkyl groups (e.g., having from 1 to about 5 carbon atoms), hydrogen, or together constitute a cyclic hydrocarbon group, and n equals at least 10 (e.g., n equals about 40 to 400, typically about 50). Commonly the aromatic polyester utilized in accordance with the process of this invention has a chlorine and/or bromine content of about 15% to 60% by weight based upon the weight of the aromatic polyester (e.g., a chlorine and/or bromine content of about 25% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula may be prepared in high molecular weight by either interfacial polymerization or solution polymerization techniques as described in U.S. Pat. No. 3,234,167 which is hereby incorporated by reference. The solution polymerization method is preferred and will be described in detail herein. In this solution polymerization method, substantially equimolar amounts of (1) an appropriate bisphenol, and (2) a diacid halide such as isophthaloyl chloride or mixtures thereof with terephthaloyl chloride are reacted.

Initially the appropriate bisphenol is dissolved in a suitable solvent. A catalyst or acid acceptor is also dissolved in the solvent prior to the addition of the diacid halide.

The bisphenols which are useful in the preparation of the polyesters having recurring units of the formula illustrated above have the structure:

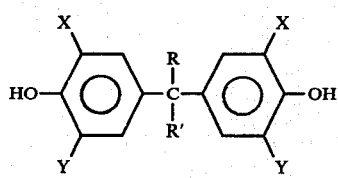

where X, Y, R and R' have the same significance as set forth hereinabove. Suitable bisphenols which are useful in the practice of this invention include bis(3,5-dibromo-4-hydroxyphenyl)methane; bis(3,5-dichloro-4-hydroxyphenyl)methane; bis(3-chloro-5-bromo-4-hydroxyphenyl)methane; 1,1-bis(3,5-dibromo-4-hydroxyphenyl)ethane; 1,1-bis-(3,5-dichloro-4-hydroxyphenyl)ethane; 1,1-bis-(3-chloro-5-bromo-4-hydroxyphenyl)ethane; 1,1-bis-(3,5-dibromo-4-hydroxyphenyl)propane; 1,1-bis-(3,5-dichloro-4-hydroxyphenyl)propane; 1,1-bis-(3-chloro-5-bromo-4-hydroxyphenyl)propane; 2,2-bis-(3,5-dibromo-4-hydroxyphenyl)propane; 2,2-bis-(3,5-dichloro-4-hydroxyphenyl)propane; 2,2-bis-(3-chloro-5-bromo-4-hydroxyphenyl)propane; bis-(3-bromo-4-hydroxyphenyl)methane; bis-(3-chloro-4-hydroxyphenyl)methane; 3-bromo-3'-chloro-bis(4-hydroxyphenyl)methane; 1,1-bis-(3-bromo-4-hydroxyphenyl)ethane; 1,1-bis-(3-chloro-4-hydroxylphenyl)ethane; 3-bromo-3'-chloro-bis-(4,4'-hydroxyphenyl)ethane; 1,1'-bis-(3-bromo-4-hydroxyphenyl)propane; 1,1'-bis(3-chloro-4-hydroxyphenyl)propane; 1,1'-(3-chloro-3'-bromo-bis-[4,4'-hydroxyphenyl])propane; 2,2'-bis-(3-bromo-4-hydroxyphenyl)propane; 2,2'-bis-(3-chloro-4-hydroxyphenyl)propane; 2,2'-(3-bromo-3'-chloro-bis[4,4'-hydroxyphenyl])propane; as well as their alkali metal salts.

Preferred bisphenols are 2,2-bis-(3,5-dibromo-4-hydroxyphenyl)propane, also known as tetrabromobisphenol A, and 2,2-bis-(3,5-dichloro-4-hydroxyphenyl)propane, also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

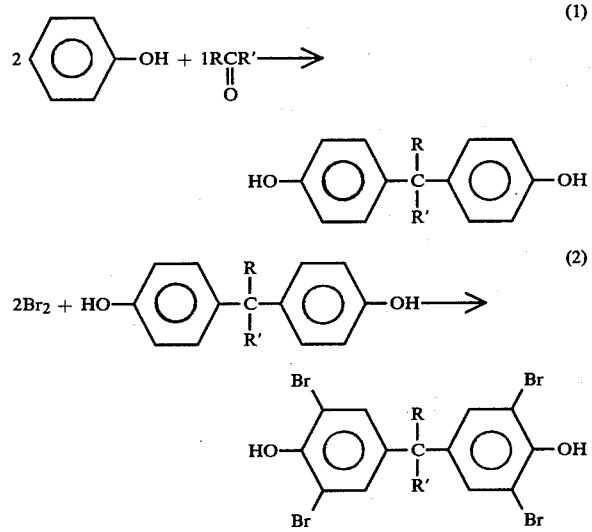

The solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Suitable solvents which may be utilized in the solution polymerization technique described herein include chloroalkanes and aromatic and chloroaromatic compounds. Examples of such compounds include methylene chloride, chloroform, tetrachloroethane, trichloroethane, chlorobenzene, chlorotoluene, dichloroethane, benzene, toluene, and xylene.

The catalyst or acid acceptor is preferably a tertiary amine which is capable of undergoing a reaction with the bisphenol to form a complex salt. The bisphenol complex salt subsequently reacts with the diacid halide and liberates an amine halide.

Stoichiometric amounts of the bisphenol and the catalyst would require a ratio of the tertiary amine to the bisphenol of about 2:1. However, it has been found that in order for the reaction to proceed at a commercially acceptable rate, an excess of acid acceptor should be employed. The amount of excess said acceptor is generally less than about 50, typically less than about 20, and preferably less than about 5 percent by weight based upon the stoichiometric amount of acid acceptor required. The upper limit of acid acceptor is not critical. However, it should be remembered that excess amounts of acid acceptor must be neutralized and the reaction product of the neutralization reaction must be separated from the final polymer product.

Representative examples of suitable tertiary amine catalysts or acid acceptors include triethylamine, diamino2,2,2,bicyclo octane, tripropyl amine, dimethyl aniline, pyridine, dimethyl amine and benzyl amine. Triethylamine is a preferred acid acceptor.

It will be noted that halogenated aromatic polyesters are prepared by the condensation of bisphenols with the diacid halides of isophthalic acid or mixtures thereof with the diacid halide of terephthalic acid. The use of a diacid halide as opposed to other corresponding derivatives is important in that it is normally not possible to directly prepare polymers from bisphenols and free acids. These acid halides may be derived from the corresponding dicarboxylic acids by any one of several methods well known in the art such as by reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical, the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of from about 45 to about 75%, preferably from about 55 to about 65% (e.g., 60%) by weight isophthaloyl chloride and correspondingly from about 25 to about 55%, preferably from about 35 to about 45% (e.g., 40%) by weight terephthaloyl chloride.

In preparing a preferred chlorinated aromatic polyester, the diacid halide will generally be utilized as an aromatic acid chloride mixture of from about 40 to about 90%, preferably from about 60 to about 80% (e.g., 70%) by weight isophthaloyl chloride, and correspondingly from about 10 to about 60%, preferably from about 20 to about 40% (e.g., 30%) by weight terephthaloyl chloride.

For smooth operation in a stirred solution, the resulting polymer product preferably should be about 10% or less on the basis of the total weight of the solvent although percentages as high as 25% may be utilized depending upon the molecular weight of the polymer.

Generally substantially stoichiometric amounts of each reactant are employed. Typical molar amounts of from about 1:0.9:0.1 to about 1:0.4:0.6, of the ratio of bisphenol, isophthaloyl chloride, and terephthaloyl chloride, respectively, may be utilized when preparing a chlorinated aromatic polyester. Typical molar amounts of from about 1:0.45:0.55 to about 1:0.75:0.25 of the ratio of bisphenol, isophthaloyl chloride, and terephthaloyl chloride, respectively, may also be utilized when preparing a brominated aromatic polyester.

The polymerization reaction may be carried out in a batch, semi-continuous, or continuous manner, as desired. However, in a preferred embodiment, the reaction is carried out in a continuous manner, by which the reactants are continuously introduced into the reaction zone and the polymer product is continuously prepared and withdrawn. This may be achieved, for example, by utilizing a cylindrical tube, having static mixers as a reaction vessel. The bisphenol containing solution is passed through the tube while adding the diacid halide at various points along the longitudinal axis of the tube. Thus, the diacid halide is added in large amounts at the upstream portion of the tube and in gradually decreasing amounts at positions further downstream in the tube.

The final concentration of the polymer in solution is from about 3 to about 25%, typically from about 5 to about 20%, and preferably from about 7 to about 15%, by weight of the total reaction mixture. At these concentrations, the solution viscosity will generally vary from about 1 to about 3000 poise, typically from about 5 to about 2000 poise, and preferably from about 10 to about 1000 poise.

Polymerization is effected at temperatures which may vary from about 0 to about 200, typically from about 10 to about 100, and preferably from about 15° to about 50° C., and at corresponding autogenous pressures which are due to the vapor pressure of the solvent at the aforenoted temperatures which may vary from about 0.2 to about 26, typically from about 0.3 to about 4.8, and preferably from about 4.0 to about 1.4, atmospheres.

Agitation of the reactants should be sufficient to evenly disperse the diacid halide throughout the bisphenol containing solution to avoid a build-up of the concentration of the diacid halide in a localized area within the reaction mixture. Such agitation may be supplied by any of the standard means of mixing such as by stirrer, shaker, static mixer, spray nozzle or other flow agitating systems.

The present process typically employs reaction times of generally from about 0.1 to about 20, typically from about 1 to about 10, and preferably from about 2 to about 6, hours when conducted on a batch basis. Polymerization conducted on a continuous basis will typically employ shorter polymerization times depending on the degree of mixing.

At the conclusion of the polymerization reaction, the polymer solution which contains tertiary amine hydrochloride and unreacted tertiary amine must be treated with hydrogen chloride to neutralize the unreacted tertiary amine. This hydrogen chloride may be in the form of an aqueous hydrochloric acid solution, or, in a preferred embodiment as disclosed in copending patent application U.S. Ser. No. 208,366, entitled "Improved Process for Producing Halogenated Aromatic Polyesters", filed concurrently herewith by Albert G. Williams, the hydrogen chloride may be introduced in the form of gaseous, substantially anhydrous, hydrogen chloride. The disclosure of the above-identified patent application is hereby incorporated by reference.

After neutralization of the tertiary amine, the tertiary amine hydrochloride must be removed from the polymer containing solution. This may be accomplished by multiple batch extraction with water or by employing the continuous countercurrent extraction method disclosed in copending patent application U.S. Ser. No. 208,201, entitled "Continuous Countercurrent Extraction Process for Removing Water Soluble Impurities From Water Immiscible Polymer Solutions", filed concurrently herewith by Albert G. Williams. The disclosure of this patent application is hereby incorporated by reference.

After removal of the water-soluble impurities, the halogenated aromatic polyester may be recovered in any suitable manner such as evaporation of the solvent or by precipitation of the polymer in a suitable non-solvent such as acetone or methanol. The polymer may then be isolated in solid form and dissolved in a suitable solvent at a concentration sufficient to achieve the desired spinning dope viscosity or concentrated without isolation to the desired spinning dope viscosity by employing the method disclosed in copending patent application U.S. Ser. No. 208,202, entitled "Flash Evaporation Process for Concentrating Polymer Solutions", filed concurrently herewith by Albert G. Williams, and thereafter processed for shaping. The disclosure of this patent application is hereby incorporated by reference.

The halogenated aromatic polyesters may be dissolved in a suitable spinning or casting solvent, such as methylene chloride or tetrahydrofuran and formed into a shaped article, such as a fiber or film.

The halogenated aromatic polyester fibers may then be drawn in order to produce fibers having improved tensile properties. A preferred method for drawing these fibers is disclosed in copending patent application U.S. Ser. No. 208,364, entitled "Improved Process for Drawing Halogenated Aromatic Polyester Fibers", filed concurrently herewith by Albert G. Williams. This process comprises drawing the fiber at a draw ratio of from about 3:1 to about 10:1 and a temperature of from about 315° to about 355° C. to produce fibers having improved tensile properties. The disclosure of the above-identified patent application is hereby incorporated by reference.

The term "fiber" as used in this specification includes continuous filaments, fibers, continuous yarns made from the former materials, and tows.

The solvent resistance of the halogenated aromatic polyester fibers, whether drawn or not, may be improved by heating the halogenated aromatic polyester fibers at substantially constant length at a temperature of from about 270° to about 295° C., preferably from about 280° to about 290° for a time of from about 5 to about 60 minutes, preferably from about 10 to about 40 minutes.

The above temperatures are critical in that substantially no effect takes place at about 260° C. and the polymer decomposes at about 300° C. The time used for heat treatment is dependent upon the temperature of the heat treatment. As the temperature of the heat treatment increases, the time needed for such treatment is less. It will be understood that from a commercial standpoint the fiber will generally always be drawn before the heat treatment.

It should also be noted that the inherent viscosity of the halogenated aromatic polyester determines the maximum temperature at which heat treatment can take place. As the inherent viscosity of the halogenated aromatic polyester increases, the temperature at which it can be treated, without decomposition, increases. For example, halogenated aromatic polyesters having an inherent viscosity of 0.8 dl/gm. or less should be heat treated at temperatures of about 280° C., while halogenated aromatic polyesters having an inherent viscosity of 1.15 to 1.7 dl/gm (e.g., 1.5 to 1.2 dl/gm) may be treated at a temperature of about 290° to about 295° C. without decomposition.

It has been found that in order to achieve the improvements in solvent resistance, the length of these fibers during the heating procedure must be controlled at substantially constant length to within ±5%, i.e., in a manner sufficient to prevent a longitudinal shrinkage of greater than about 5%, and a longitudinal extension greater than about 5%, based on the original length of the fibers prior to the heat treatment. Preferably the length of the fibers is controlled during heating in a manner sufficient to avoid any longitudinal shrinkage or extension (i.e., constant length) based on the original length of the fibers prior to heating.

The required control of length of the fibers exercised during the heat treating process necessary to achieve the improvement in solvent resistance may be achieved by any means known to those skilled in the art.

Thus, in a continuous process, the halogenated aromatic polyester fibers can be conveyed in the direction of their length from a first stress isolation device through a heating zone, where they are heated in the manner described, to a second stress isolation device located at the exit of the heating zone.

Each stress isolation device may conveniently take the form of a pair of skewed rolls.

Accordingly, the polyester fibers may be wound several times about the first pair of skewed rolls, passed through the heating zone and wound several times about the second pair of skewed rolls. This arrangement permits isolation and control of the stress of the fibers between the two pairs of rolls as they undergo the heat treatment and therefore controls their length.

Consequently, by manipulating the speed ratio, i.e., the differential ratio of the surface speed of the rollers at the exit of the heating zone to the surface speed of the rollers at the entrance of the heating zone, the length of the polyester fibers can be controlled in the manner required.

Thus, with a speed ratio of 1.0, the surface speeds of the two sets of rollers are equivalent, and the polyester fibers will be maintained at constant length (i.e., 0% shrinkage or extension). When the speed ratio is less than 1.0, the polyester fibers will undergo relaxation to some degree depending on how low the speed ratio is set. Conversely, if the speed ratio is greater than 1.0 the polyester fibers will be stretched during passage through the heating zone.

The heating procedure, as described above, is carried out in a heating zone, for example, in an oven heated to the appropriate temperature through which a continuous run of the yarn or bundle of fibers is passed. Such heat treatment may be by means of a hot fluid heat transfer medium, such as superheated steam, nitrogen, carbon dioxide, air and the like, and mixtures thereof (e.g., using a jacketed tube or shroud), by infrared rays, by dielectric heating or by direct contact of the running yarn or bundle with a heated metal surface, preferably curved, to make good contact such as a hot shoe.

When the fibers are to be heat treated at substantially constant length in a batch process, the fibers can be wound around an aluminum bobbin and inserted into a forced hot air oven or other suitable heating source maintained at the appropriate temperature.

The inherent viscosity of the polymer is determined by measuring the relative viscosity of a 0.1% solution of the polymer at 25° C. in a suitable solvent, such as a 10/7 (w/w) mixture of phenol/trichlorophenol. The viscosity of the polymer solution is measured relative to the solvent alone and the inherent viscosity (I.V.) is determined from the following equation:

$$I.V. = \frac{\ln\left(\frac{V_2}{V_1}\right)}{C}$$

In the above formula, $V_2$ is the efflux time of the polymer solution, $V_1$ is the efflux time of the solvent alone, and C is the concentration expressed in grams of polymer per hundred milliliters of solution.

Halogenated aromatic polyesters described herein can be prepared having inherent viscosities (I.V.) which may vary from about 0.4 to about 1.7, typically from about 0.6 to about 1.5, and preferably from about 0.7 to about 1.2, deciliters per gram, which are indicative of polymers having a weight average molecular weight of from about 25,000 to about 150,000, typically from about 40,000 to about 123,000, and preferably from about 50,000 to about 97,000.

Halogenated aromatic polyesters which are not heat treated are sensitive to solvents such as Perclene commercial cleaning fluid (Perclene TM is the trade name for a composition comprising perchloroethylene and surfactants).

For example, although fibers drawn at high draw ratios (e.g., from about 10:1 to about 3:1) and elevated temperatures (315°–355° C.) can withstand the standard Perclene TM test (10 minute immersion in Perclene TM solvent at 30° C.), they cannot withstand immersion in Perclene solvent at higher temperatures and for greater time periods.

However, the halogenated aromatic polyester fibers treated in accordance with the process of the present invention are capable of withstanding 5 to 20 minute immersions in perchloroethylene which is at a temperature of from about 60° to about 70° C., i.e., these fibers are substantially undegraded and unaffected by the immersions in perchloroethylene.

Other solvents to which the above-mentioned fibers exhibit improved solvent resistance include trichloroethylene, methylene chloride, tetrachloroethane, tetrachloroethylene, perchlorinated ethylene and ethane, carbon tetrachloride, chloroform, chlorobenzene, and Stoddard solvent and common organic hydrocarbon solvents such as alcohols, ketones, esters and ethers.

The halogenated aromatic polyester fibers described herein have been used to produce a number of inherently non-burning fibrous materials which are particularly advantageous when fibrous articles are required for use in fire-control environments, such as children's sleepwear, suits for fire fighters, hospital furnishings, and uniforms for military and civilian personnel.

The following example is given as a specific illustration of the claimed invention. It should be understood, however, that the invention is not limited to the specific details set forth in the example. All parts and percentages in the example as well as in the remainder of the specification are by weight unless otherwise specified.

EXAMPLE 1

Part A

Two hundred one and seven tenths parts by weight tetrabromobisphenol A, 45.2 parts by weight isophthaloyl chloride and 30.1 parts by weight of terephthaloyl chloride are reacted to form a brominated aromatic polyester in the presence of about 2600 parts by weight methylene chloride solvent and 77.3 parts by weight of triethylamine acid acceptor.

The contents of the reaction zone are heated at atmospheric pressure at about 40° C. with agitation for 3 hours.

When the reaction is complete substantially anhydrous hydrogen chloride is bubbled through a gas sparge into the solution for five minutes until the excess triethylamine is neutralized, as determined by measuring the pH of the solution. The excess triethylamine is neutralized when the pH is reduced to below about 3.0. The pH is measured by determining the pH of the water layer of a mixture which is prepared by mixing 50% by weight reaction solution with 50% by weight distilled water.

The reaction mixture is then washed with water until a pH of 6 is achieved and the tertiary amine HCl is removed. The resulting brominated polyester is recovered by precipitation with methanol and has an inherent viscosity of between 1.0 and 1.1 dl/gm.

One hundred parts by weight of the brominated aromatic polyester are dissolved in 300 parts by weight of a methylene chloride spinning solvent. The solution is filtered and deaerated and extruded through a chrome plated stainless steel spinneret having 20 circular holes of 44 microns diameter each. The as-spun filamentary material is passed into an air chamber provided at 70° C. which flows concurrently and wherein the filamentary material is completely solidified and subsequently is taken up at a rate of 200 meters per minute.

The filamentary material next is hot drawn at a draw ratio of about 3:1 by contact with a 12 inch hot shoe provided at about 325° C. using the apparatus and method described in greater detail in U.S. Ser. No. 208,364, entitled "Improved Process for Drawing Halogenated Aromatic Polyester Fibers", and filed concurrently herewith by Albert G. Williams.

Part B

The drawn fiber is then heat treated at 290° C. for 10 minutes at substantially constant length.

More specifically, the drawn fiber is wrapped around an aluminum bobbin and inserted into a forced hot air oven maintained at 290° C. for 10 minutes.

Part C

Samples of fibers from Part B are then immersed into a solution of Perclene TM dry cleaning solvent under the conditions of temperature and time given in Table I runs 1 to 5. In each case, the fiber remains intact without significant deterioration as determined by visual observation. Attack by the solvent would be observed as holes in the fiber caused by leaching out of non-solvent resistant portions of polymer by the solvent.

TABLE I

| Run No. | Temperature, °C. | Time, mins |
|---------|------------------|------------|
| 1 | 60 | 5 |
| 2 | 60 | 10 |
| 3 | 60 | 15 |
| 4 | 70 | 15 |
| 5 | 70 | 20 |

An alternate method for evaluating the enhanced solvent resistance of the fibers of the present invention can be conducted by measuring the shrinkage of the fibers which occurs while in contact with the solvent at a selected temperature. Fiber shrinkage is inversely proportional to solvent resistance. The fibers of the present invention can withstand temperatures of about 80° C. for periods of about 10 minutes without shrinkage.

COMPARATIVE EXAMPLE

This Comparative Example is conducted in order to illustrate the improved solvent resistance of the fibers treated in accordance with the present invention over those fibers which were not so treated.

In run A, a sample of the polyester fibers of Example 1, Part A are immersed in Perclene TM solvent at 70° C. for 20 minutes and visually compared with samples of fibers from Example 1, Part C, run 5 and designated as run B. The results are summarized in Table II below:

TABLE II

| Run | Drawn | Heat Treatment | Perclene TM Test (for 20 minutes at 70° C.) |
|-----|-------|----------------|---------------------------------------------|
| A | yes (3:1) | no | fibers deteriorate badly |
| B | yes (3:1) | yes (290° C. for 10 minutes) | no significant deterioration |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. Improved solvent resistant halogenated aromatic polyester fibers of the recurring structural formula:

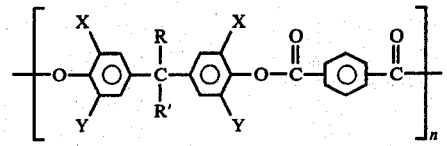

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, produced by heat treating said fibers at substantially constant length at a temperature of from about 270° to about 295° C. for from about 5 to about 30 minutes.

2. The fibers according to claim 1 wherein said halogenated aromatic polyester fibers are drawn at a draw ratio of from about 3:1 to about 10:1 at a temperature of from about 315° to about 355° C. prior to said heat treatment.

3. The fibers according to claim 1 produced by heat treating said fibers at substantially constant length at a temperature of from about 280° to about 290° C. for from about 10 to about 40 minutes to produce modified halogenated aromatic polyester fibers capable of withstanding 5 to 20 minute immersions in perchloroethylene which is at a temperature of from about 60° to about 70° C.

4. The fibers according to claim 3 wherein said fibers are drawn at a draw ratio of from about 3:1 to about 10:1 at a temperature of from about 315° to about 355° C. prior to said heat treatment.

5. The fibers according to claim 1 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

6. The fibers according to claim 1 wherein said halogenated aromatic polyester of the recurring structural formula is a product of tetrabromobisphenol A and a mixture of about 60% by weight isophthaloyl chloride and correspondingly about 40% by weight terephthaloyl chloride.

7. The fibers according to claim 1 wherein said halogenated aromatic polyester of the recurring structural formula is a product of tetrachlorobisphenol A and a mixture of about 90 to 40% by weight isophthaloyl chloride and correspondingly about 10 to 60% by weight terephthaloyl chloride.

8. The fibers according to claim 1 wherein said halogenated aromatic polyester of the recurring structural formula is a product of tetrachlorobisphenol A and a mixture of about 70% by weight isophthaloyl chloride and correspondingly about 30% by weight terephthaloyl chloride.

9. Improved solvent resistant fibers formed from a halogenated aromatic polyester which is the condensation product of tetrabromobisphenol A with a mixture of about 40% by weight terephthaloyl chloride and about 60% by weight isophthaloyl chloride, said fibers produced by heat treating said fibers at substantially constant length at a temperature of from about 280° to about 290° C. for from about 10 to about 40 minutes to produce modified fibers capable of withstanding 5 to 20 minute immersions in perchloroethylene which is at a temperature of from about 60° to about 70° C.

10. A process for improving the solvent resistance of halogenated aromatic polyester fibers comprising heat treating halogenated aromatic polyester fibers of the recurring structural formula:

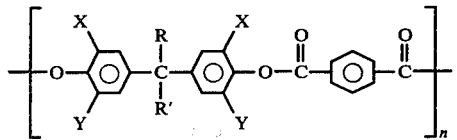

where X which may be the same or different, is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, at substantially constant length at a temperature of from about 270° to about 295° C. for from about 5 to about 60 minutes to produce modified halogenated aromatic polyester fibers capable of withstanding 5 to 20 minute immersions in perchloroethylene which is at a temperature of from about 60° to about 70° C.

11. The process according to claim 10 wherein R and R' may contain from 1 to about 5 carbon atoms and wherein n may be from about 40 to about 400.

12. The process according to claim 10 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

13. The process according to claim 10 wherein said halogenated aromatic polyester of the recurring structural formula is a product of tetrabromobisphenol A and a mixture of about 60% by weight isophthaloyl chloride and correspondingly about 40% by weight terephthaloyl chloride.

14. The process according to claim 10 wherein said halogenated aromatic polyester of the recurring structural formula is a product of tetrachlorobisphenol A and a mixture of about 90 to 40% by weight isophthaloyl chloride and correspondingly about 10 to 60% by weight terephthaloyl chloride.

15. The process according to claim 10 wherein said halogenated aromatic polyester of the recurring structural formula is a product of tetrachlorobisphenol A and a mixture of about 70% by weight isophthaloyl chloride and correspondingly about 30% by weight terephthaloyl chloride.

16. The process according to claim 10 wherein the halogenated aromatic polyester fibers are drawn at a draw ratio of from about 3:1 to about 10:1 at a temperature of from about 315° to about 355° C. prior to said heat treatment.

17. A process for improving the solvent resistance of halogenated aromatic polyester fibers comprising heat treating halogenated aromatic polyester fibers of the recurring structural formula:

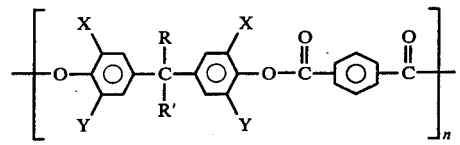

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, at substantially constant length at a temperature of from about 280° to about 290° C. for from about 10 to about 40 minutes to produce modified halogenated aromatic polyester fibers capable of withstanding 5 to 20 minute immersions in perchloroethylene which is at a temperature of from about 60° to about 70° C.

18. The process according to claim 17 wherein R and R' may contain from 1 to about 5 carbon atoms and wherein n may be from about 40 to about 400.

19. The process according to claim 17 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

20. The process according to claim 17 wherein said halogenated aromatic polyester of the recurring structural formula is a product of tetrabromobisphenol A and a mixture of about 60% by weight isophthaloyl chloride and correspondingly about 40% by weight terephthaloyl chloride.

21. The process according to claim 17 wherein said halogenated aromatic polyester of the recurring structural formula is a product of tetrachlorobisphenol A and a mixture of about 90 to 40% by weight isophthaloyl chloride and correspondingly about 10 to 60% by weight terephthaloyl chloride.

22. The process according to claim 17 wherein said halogenated aromatic polyester of the recurring structural formula is a product of tetrachlorobisphenol A and a mixture of about 70% by weight isophthaloyl chloride and correspondingly about 30% by weight terephthaloyl chloride.

23. The process according to claim 17 wherein the halogenated aromatic polyester fibers are drawn at a draw ratio of from about 3:1 to about 10:1 at a temperature of from about 315° to about 355° C. prior to said heat treatment.

24. A process for improving the solvent resistance of the fibers formed from a halogenated aromatic polyester which is the condensation product of tetrabromobisphenol A with a mixture of about 40% by weight terephthaloyl chloride and about 60% isophthaloyl chloride, said process comprising heat treating said fibers at substantially constant length at a temperature of from about 280° to about 290° C. for from about 10 to about 40 minutes to produce modified fibers capable of withstanding 5 to 20 minute immersions in perchloroethylene which is at a temperature of from about 60° to about 70° C.

* * * * *